US011496738B1

(12) United States Patent
Waggoner et al.

(10) Patent No.: US 11,496,738 B1
(45) Date of Patent: Nov. 8, 2022

(54) OPTIMIZED REDUCED BITRATE ENCODING FOR TITLES AND CREDITS IN VIDEO CONTENT

(71) Applicant: Amazon Technologies, Inc., Seattle, WA (US)

(72) Inventors: Charles Benjamin Waggoner, Portland, OR (US); Rahul Vanam, San Diego, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/210,958

(22) Filed: Mar. 24, 2021

(51) Int. Cl.
| | |
|---|---|
| *H04N 19/124* | (2014.01) |
| *H04N 19/186* | (2014.01) |
| *H04N 19/176* | (2014.01) |
| *H04N 19/563* | (2014.01) |
| *G06V 20/40* | (2022.01) |
| *G06T 7/11* | (2017.01) |
| *G06V 30/10* | (2022.01) |

(52) U.S. Cl.
CPC ........... *H04N 19/124* (2014.11); *G06V 20/40* (2022.01); *H04N 19/176* (2014.11); *H04N 19/186* (2014.11); *H04N 19/563* (2014.11); *G06T 7/11* (2017.01); *G06V 30/10* (2022.01)

(58) Field of Classification Search
CPC .. H04N 19/124; H04N 19/176; H04N 19/563; H04N 19/186; G06K 9/00711; G06K 2209/01
See application file for complete search history.

(56) References Cited

U.S. PATENT DOCUMENTS

| | | | | |
|---|---|---|---|---|
| 2010/0124274 | A1* | 5/2010 | Cheok | H04N 19/17 375/E7.125 |
| 2011/0119313 | A1* | 5/2011 | Sung | G11B 27/034 707/802 |
| 2014/0307780 | A1* | 10/2014 | Cohen | H04N 19/119 375/240.03 |
| 2015/0023424 | A1* | 1/2015 | Lim | H04N 19/53 375/240.16 |
| 2016/0205409 | A1* | 7/2016 | Park | H04N 19/176 375/240.12 |
| 2020/0042837 | A1* | 2/2020 | Skinner | G06K 9/623 |
| 2020/0410718 | A1* | 12/2020 | Zhong | G06V 10/507 |
| 2021/0124979 | A1* | 4/2021 | Andreotti | G06K 9/6256 |

\* cited by examiner

*Primary Examiner* — Richard T Torrente
(74) *Attorney, Agent, or Firm* — Eversheds Sutherland (US) LLP

(57) ABSTRACT

Embodiments include systems, methods, and computer-readable media for optimized reduced bitrate encoding for text-based content in video frames. Example methods may include determining that a first segment of video content includes a content scene, determining that a second segment of the video content includes text, and determining a first encoder configuration to encode the first segment of video content, where the first encoder configuration includes a first encoding parameter setting. Example methods may include determining a second encoder configuration to encode the second segment of the video content, where the second encoder configuration includes a second encoding parameter setting, encoding the first segment using the first encoder configuration, and encoding the second segment using the second encoder configuration. The first segment may be encoded at a first bitrate that is greater than a second bitrate at which the second segment is encoded.

18 Claims, 6 Drawing Sheets

OPTIMIZED REDUCED BITRATE ENCODING FOR TITLES AND CREDITS IN VIDEO CONTENT

BACKGROUND

Certain digital content, such as movies, television shows, live content, and other video content may be streamed using electronic devices. Such video content may include various portions, such as a title screen, content scenes, credits, and other portions. Certain portions of video content may be more complex than others. For instance, action content scenes may be more complex than a credits frame of video content. However, the video content may be encoded using the same encoding parameters. Such encoding may be inefficient. Accordingly, optimized reduced bitrate encoding for titles and credits in video content may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may include video content, such as movies, television shows, streaming shows (e.g., made for Amazon Prime, Netflix, etc.), and other video content. Users may stream content using one or more devices. In some instances, text-based scenes of content, such as title scenes, credits scenes, and so forth, may make up a portion of the content that is streamed. Such scenes may be primarily text, and in many instances, may be light colored text presented against a dark colored background. Video content that is streamed may be encoded using the same encoding parameters, regardless of the type of content or the type of scenes presented in the content. Accordingly, credits scenes may be encoded using the same parameters as other portions of the content. Such encoding may be suboptimal and inefficient. Video content is typically encoded using compression algorithms to reduce the number of bits needed to transmit video frames for the video content to a viewer's device where they are decoded for playback. A single set of encoding parameters is typically used during the encoding process. Unfortunately, a single set of encoding parameters might not result in the best encoding for some visual elements of a given video frame.

Embodiments of the disclosure may optimize reduced bitrate encoding for text-based content in video frames, such as titles and credits in video content, and may provide improved compression ratios, reduced encoding times, and reduced bandwidth consumption, while maintaining high visual quality for viewers of the text-based scenes. Video bitrate is the amount of video data transferred in a certain period. Without a high bitrate, high resolution and high frame rate video may not appear in optimal form. However, for text-based scenes, high bitrates may not be necessary for high visual quality. Although example embodiments discussed herein are described in the context of titles and credits scenes, any text-based scene, or hybrid frames that include text and imagery side by side may be optimized. In addition, graphics content such as line art, logos, and other graphics on flat backgrounds may be encoded using the text-based optimized encoding parameters described herein. Accordingly, embodiments may optimize encoding of content in addition to text-based content.

Titles and credits scenes can represent up to, or more than, about 5% of total minutes of content for movies, television shows, and/or other video content. By using different encoding parameters for text-based scenes, certain embodiments can provide up to an overall 5% bitrate reduction. Some embodiments exploit the characteristics of white text on a black background that move consistently to provide higher compression ratios than typically used, without material quality degradation.

Figure 1:
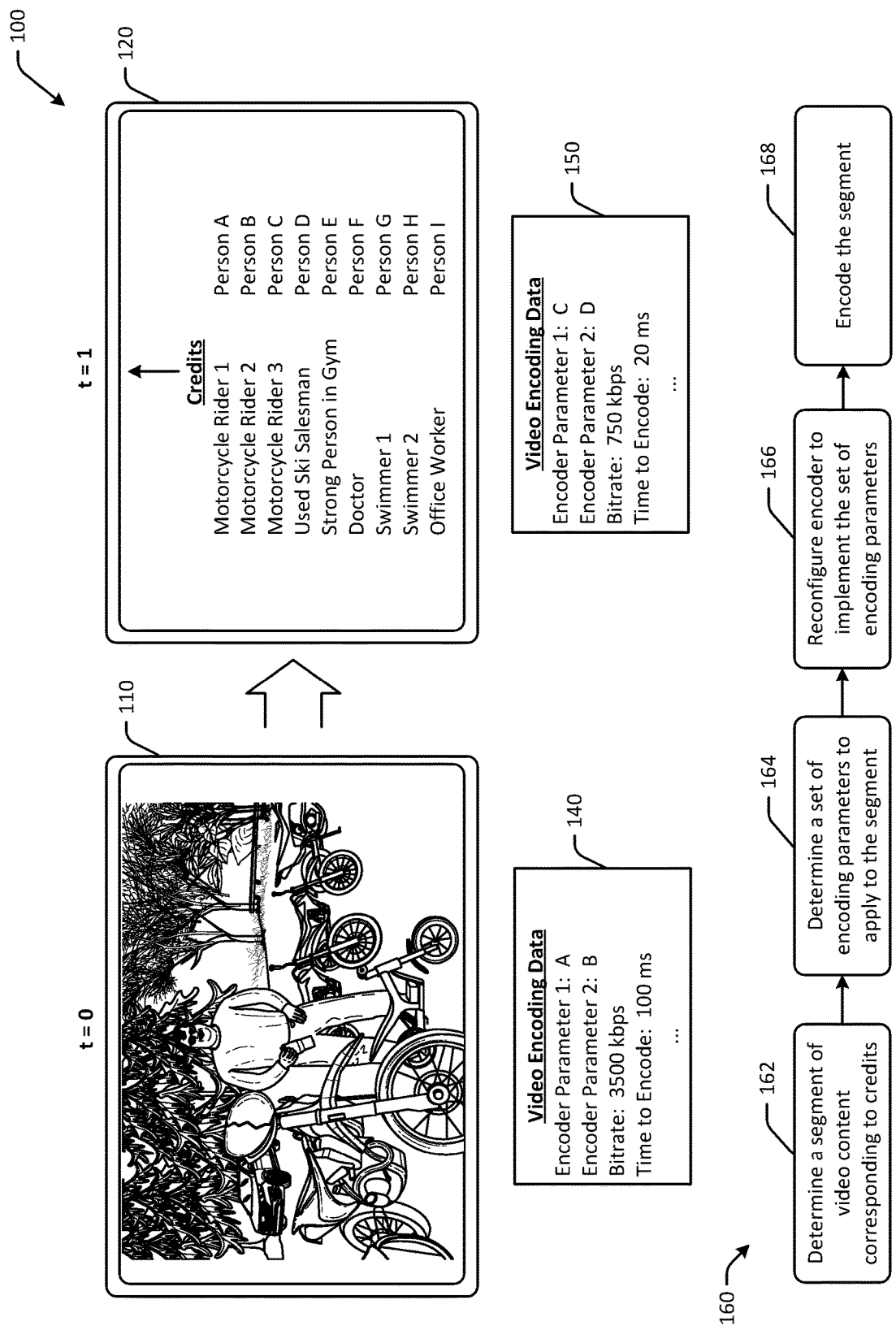
FIG. 1 is a schematic illustration of an example use case for optimized reduced bitrate encoding for text-based content in video frames in accordance with one or more example embodiments of the disclosure.

Referring to FIG. 1, an example use case 100 for optimized reduced bitrate encoding for text-based content in video frames is depicted in accordance with one or more example embodiments of the disclosure. In the example of FIG. 1, video content may be streamed at a device. For example, at a first point in time, a first frame 110 may be presented at the user device, where the first frame 110 is a story scene, or part of the video content that does not include text. The first frame 110 and/or the segment of video that includes the first frame 110 may be encoded as indicated in video encoding data 140. The video encoding data 140 indicates that, for example, the first frame 110 was encoded using a first encoder parameter setting, a second encoder parameter setting, was encoded at a bitrate of 3500 kbps, and took 100 milliseconds to encode.

A second frame 120 may be presented at a second point in time and may be a credits scene of the content. The second frame 120 may be determined to be a text-based scene, such as a credits or title scene, and may therefore be encoded using different encoding parameters at a lower bitrate. Due to the nature of the text-based scene, visual quality may not be noticeably impacted. The second frame 120 and/or the segment of video that includes the second frame 120 may be encoded as indicated in video encoding data 150. The video encoding data 150 indicates that, for example, the second frame 120 was encoded using a third encoder parameter setting (that is different than the first encoder parameter setting of the first frame 110), a fourth encoder parameter setting (that is different than the second encoder parameter setting of the first frame 110), was encoded at a bitrate of 750 kbps, and took 20 milliseconds to encode (relative to the 100 milliseconds for the first frame 110).

Embodiments of the disclosure may therefore use different encoding parameters for text-based frames or video segments than for other segments of video content. In addition, in some embodiments, different encoding parameters may be applied to different portions of frames. For example, during the encoding process, a first pass analyzing a video frame may be performed to determine the set of encoding parameters to be applied to different portions of a video frame. Instead of using encoding parameters that are generalized from an average complexity estimate of a video frame, embodiments may detect different regions and apply different encoding parameters. For example, if a portion of a frame includes text and motion graphics with sharp edges, then a value of an encoding parameter such as the quantization parameter can be tuned to accommodate the high spatial frequency content. If another region of the same frame includes natural imagery with smooth, continuous tones, the quantization parameter can be tuned to provide efficient coding of a low spatial frequency content video frame. The values for the parameter settings might be different to account for the different characteristics of the different regions. For example, encoding parameters for scrolling text representing the closing credits may include a transform skip parameter because the number of bits to encode the high spatial frequency content corresponding to the sharp edges of the text may exceed the number of bits needed to directly encode the non-transformed pixel values corresponding to the text. In contrast, other regions may not include the transform skip setting.

To optimize encoding of text-based scenes, a video encoding engine may be executed at a server and may perform operations in an example process flow 160. server may include at least one memory that stores computer-executable instructions and at least one processor configured to access the at least one memory and execute the computer-executable instructions to perform various actions or operations, such as one or more of the operations in the process flow 160 of FIG. 1.

At a first block 162, the server may determine a segment of video corresponding to credits or other text-based content, such as title. For example, the server may be configured to determine whether the credits are presented as picture-in-picture video, and so forth. To determine whether a segment is a text-based segment, the server may be configured to use luma values (e.g., determine that there are consistent minimum and maximum luma values, along with a low average luma value, etc.), the server may be configured to determine that there is a highly variable or different correlation of quantization parameter with signal to noise ratio or other metrics, the server may be configured to utilize monochrome detection by close clustering of minimum, mean, and/or maximum chroma values that tend towards 0, the server may utilize optical character recognition, the server may utilize edge detection with fast fourier transform showing text-like frequencies, and so forth. In some embodiments, the server may apply these techniques to frames or regions of frames. For regions of frames, a detected region can be identified and encoded using optimized encoding parameters, while the remainder of the frame is encoded using different parameters.

At a second block 174, the server may determine a set of encoding parameters to apply to the segment. For example, the server may improve encoding efficiency via manipulation of one or more encoding parameters. In one example, the server may increase a quantization parameters, in conjunction with deringing and deblocking codec features to maintain sharpness. In another example, non-visible slight variation in pixel brightness may be filtered out to provide uniform backgrounds. In another example, non-material variation in chroma values may be filtered out. In another example, hierarchical motion estimation may be implemented to focus bits on uniform gross motion. In another example, encoder tools like transform skip and lossless coding units can be selectively applied. In another example, chroma search or chroma coding can be excluded to improve perforation. In another example, motion search range and directions can be reduced. In another example, pattern recognition can be used to identify highly accurate motion candidates. In another example, reference frame quality of text can be refined to be a better prediction basis for efficient encoding of dependent frames. Any number of techniques may be used.

At a third block 166, the server may reconfigure the encoder to implement the set of encoding parameters. For example, the server may set quantization parameter values at the appropriate level, set a transform skip setting at the appropriate level, and so forth.

At a fourth block 168, the server may encode the segment. For example, the server may encode the segment using the set of encoding parameters that are determined to be applied to the segment. As a result, streamed video content can be encoded using dynamically determined encoding parameters, thereby providing better compression, shorter encoding latency, and/or better overall video quality for each video frame.

Example embodiments of the disclosure provide a number of technical features or technical effects. For example, in accordance with example embodiments of the disclosure, certain embodiments of the disclosure may optimize reduced bitrate encoding for text-based content in video frames, and may provide improved compression ratios, reduced encoding times, and reduced bandwidth consumption, while maintaining high visual quality for viewers of the text-based scenes. Some embodiments may determine portions of hybrid frames to encode using different encoding parameters. As a result of improved functionality, bandwidth utilization may be optimized. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
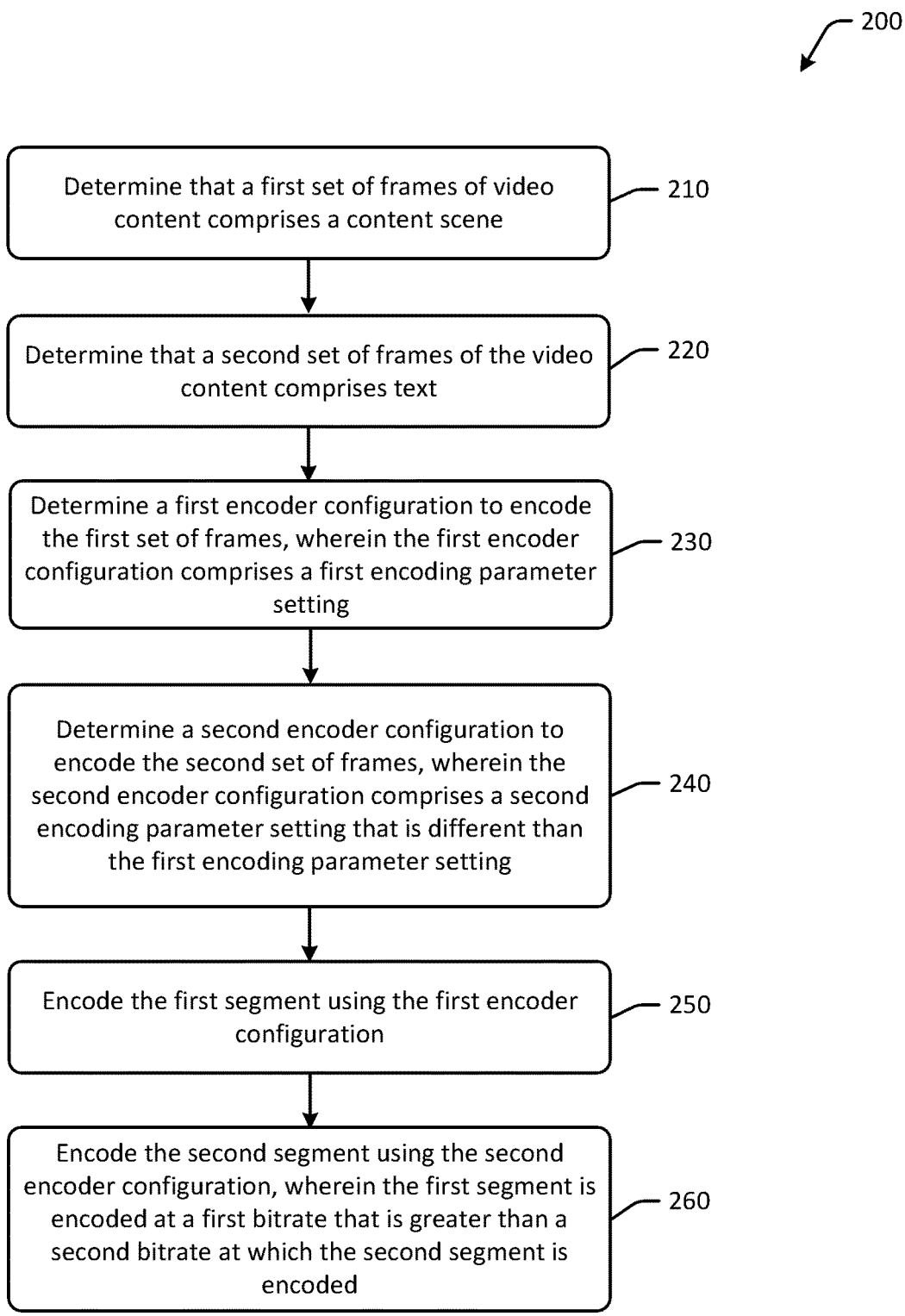
FIG. 2 is a schematic illustration of an example process flow for optimized reduced bitrate encoding for text-based content in video frames in accordance with one or more example embodiments of the disclosure.

FIG. 2 depicts an example process flow 200 for optimized reduced bitrate encoding for text-based content in video frames in accordance with one or more example embodiments of the disclosure. While example embodiments of the disclosure may be described in the context of movies and video, it should be appreciated that the disclosure is more broadly applicable to any type of streamable video content. Some or all of the blocks of the process flows in this disclosure may be performed in a distributed manner across any number of devices. The operations of the process flow 200 may be optional and may be performed in a different order.

In one example embodiment, the process flow 200 may be executed to identify portions or segments of video content that are text-based, or have a threshold amount of text (e.g., 25% of a frame is text, etc.), and to encode such segments using different encoding parameters, which results in increased efficiency. Some embodiments may encode such segments at reduced bitrates, such as bitrates of 75 kbps, as opposed to 5000 kbps, so as to reduce bandwidth utilization. Due to the nature of text-based content, such as credits scenes, title scenes, and so forth, visual appearance of the content may not be negatively or noticeably impacted. Compression of text-based segments may be increased.

At block 210 of the process flow 200, computer-executable instructions stored on a memory of a device, such as a remote server or a user device, may be executed to determine that a first set of frames of video content comprises a content scene. For example, a video encoding engine and/or one or more video encoding modules executed at a server may determine that a first set of frames of video content comprises a content scene. The first set of frames may be a group of one or more frames, such as a plurality of frames, that form a video segment. The server may be configured to process individual frames of video content, or segments of video, to determine or otherwise classify a corresponding video segment as a content scene of the video content. Content scenes may include story scenes, natural imagery, or other portions or scenes of content that are not text-based, and may not include text. For example, the content scenes may be the scenes of video content between a title scene and credits scene of video content. The server may determine that a first set of frames of video content comprises a content scene based at least in part on video processing of the frames, which may include processing using one or more algorithms, such as pattern recognition algorithms, optical character recognition algorithms, object detection algorithms, human detection algorithms, and/or other algorithms.

At block 220 of the process flow 200, computer-executable instructions stored on a memory of a device, such as a remote server or a user device, may be executed to determine that a second set of frames of the video content comprises text. For example, the video encoding engine and/or the video encoding module(s) executed at a server may determine that a second set of frames of the video content comprises text. In some embodiments, the server may determine that a second set of frames of the video content comprises a certain amount of text, such as at least 30% of a frame, or another threshold amount. In some embodiments, the server may determine a location of the text within a frame, such as using region detection, edge detection, or other algorithms. Such functionality may be used to encode different parts of a frame using different encoding parameters, particularly for hybrid frames as discussed with respect to FIG. 4. In some embodiments, the server may determine that a second set of frames of the video content comprises a credits scene or a title scene. Such determinations may be made using metadata associated with the video content (e.g., chapter data indicating the start of a credits scene, etc.), and/or via processing of frames to determine that the likelihood that a frame is a credits frame is equal to or greater than a threshold, such as 70%.

In some embodiments, after a scene or set of frames is determined to be a text-based segment of video, the server may make a determination that the text of the second segment is light colored text presented against a dark colored background, or dark colored text presented against a light colored background. Such a determination may indicate that the segment can be encoded at a reduced bitrate without impacting visual quality of a viewer of the content.

To determine that the second set of frames of the video content includes text, in some embodiments, the server may perform one or more determinations, such as determining that an average luminance value of one or more frames of the second set of frames is less than or equal to a threshold luminance value, or that a distribution of luminance values of one or more frames of the second segment satisfies a threshold luminance distribution. The luminance values may indicate that the majority of the frame is dark, and that there is a high likelihood that the frame corresponds to a credits scene with a black background. This likelihood may be increased if the average luminance value is significantly different than the peak luminance values, which may correspond to the white or light colored text.

In another embodiment, the server may determine that the second set of frames of the video content is a text-based set of frames by determining that a difference between chroma values associated with one or more frames of the second set of frames are less than or equal to a clustering threshold value. Such features may again indicate a likelihood that the frame is a credits frame. In another example, the server may determine that the second set of frames of the video content is a text-based set of frames by determining that fast fourier transform frequencies of one or more frames of the second set of frames are associated with text. Such features may again indicate a likelihood that the frame is a credits frame. One or more of these determinations, or similar determinations, may be used to identify or determine segments of video that include text or are text-based segments.

At block 230 of the process flow 200, computer-executable instructions stored on a memory of a device, such as a remote server or a user device, may be executed to determine a first encoder configuration to encode the first set of frames of video content, wherein the first encoder configuration comprises a first encoding parameter setting. For example, the video encoding engine and/or the video encoding modules executed at a device may determine a first encoder configuration to encode the first set of frames of video content, wherein the first encoder configuration comprises a first encoding parameter setting. The first encoder configuration may be a first encoding profile that corresponds to a type of content in the video segment and has a certain bitrate. For example, high action segments may be associated with a different encoder configuration than low action segments of video. Similarly, different encoder configurations may be associated with different bitrates. The server may determine the first encoder configuration for encoding of the first segment of video content. The first encoder configuration may include a first encoding parameter setting, such as a quantization parameter setting of 0-5, which may be fairly low (depending on the container type) and result in less loss. The quantization parameter setting may be used to control the amount of compression for every macroblock in a frame. Larger values mean that there will be higher quantization, more compression, and lower quality. Lower values mean lower quantization, less compression, and higher quality. The server may determine one or more encoding parameter settings that correspond to the first encoder configuration, such as the quantization parameter setting (e.g., rate control tool of encoder, etc.), a deringing parameter setting, a deblocking parameter setting, a transform skip parameter setting, and/or a lossless coding parameter setting. Other settings may be modified as well. For deblocking, a quality measure of a block based coded image can be used to find filtering modes. Based on filtering modes, the images are segmented to three classes and a specific deblocking filter is applied to each class. Deringing is obtained by an adaptive bilateral filter; spatial and intensity spread parameters are selected adaptively using texture and edge mapping.

At block 240 of the process flow 200, computer-executable instructions stored on a memory of a device, such as a remote server or a user device, may be executed to determine a second encoder configuration to encode the second set of frames of the video content, wherein the second encoder configuration comprises a second encoding parameter setting that is different than the first encoding parameter setting. For example, the video encoding engine and/or the video encoding modules executed at a device may determine a second encoder configuration to encode the second set of frames of the video content, wherein the second encoder configuration comprises a second encoding parameter setting that is different than the first encoding parameter setting. The second encoder configuration may be a second encoding profile that corresponds to a type of content in the video segment and has a certain bitrate. The second encoder configuration may be associated with text-based segments of videos or text-based portions of frames, such as credits segments. The server may determine the second encoder configuration for encoding of the second set of frames of video content. The second encoder configuration may include a second encoding parameter setting, such as a quantization parameter setting of 40-50 which may be fairly high (depending on the container type) and result in more loss. The quantization parameter setting may be used to control the amount of compression for every macroblock in a frame. Larger values mean that there will be higher quantization, more compression, and lower quality. Lower values mean lower quantization, less compression, and higher quality. The server may determine one or more encoding parameter settings that correspond to the second encoder configuration, such as the quantization parameter setting (e.g., rate control tool of encoder, etc.), a deringing parameter setting, a deblocking parameter setting, a transform skip parameter setting, and/or a lossless coding parameter setting. Other settings may be modified as well. The second encoder configuration may have more than one different encoding setting when compared to the first encoder configuration. For example, the first encoder configuration may include a third encoding parameter setting, and the second encoder configuration may include a fourth encoding parameter setting that is different than the third encoding parameter setting. The second encoder configuration may result in an encoded text-based segment of video at a reduced bitrate relative to the encoded first set of frames of video, and at a higher compression ratio and reduced file size, which may increase encoding efficiency and reduce bandwidth consumption. Visual quality may be maintained.

At block 250 of the process flow 200, computer-executable instructions stored on a memory of a device, such as a remote server or a user device, may be executed to encode the first set of frames using the first encoder configuration. For example, the video encoding engine and/or the video encoding modules executed at a device may encode the first set of frames using the first encoder configuration. The encoded first video segment may be sent to user devices for decoding and playback.

At block 260 of the process flow 200, computer-executable instructions stored on a memory of a device, such as a remote server or a user device, may be executed to encode the second set of frames using the second encoder configuration, wherein the first set of frames is encoded at a first bitrate that is greater than a second bitrate at which the second set of frames is encoded. For example, the video encoding engine and/or the video encoding modules executed at a device may encode the second set of frames using the second encoder configuration, wherein the first set of frames is encoded at a first bitrate that is greater than a second bitrate at which the second set of frames is encoded. In some embodiments, encoding the second set of frames using the second encoder configuration may include one or more of filtering pixel brightness variations equal to or less than a brightness difference threshold (e.g., a difference of less than 50%, etc.), filtering chroma value variations equal to or less than a chroma difference threshold (e.g., a difference of less than 40%, etc.), applying hierarchical motion estimation, excluding chroma search or chroma coding, reducing motion search range and motion search direction, refining reference frame quality of text, and/or refining intracoded quality of text. For instance, in a template-based approach, the encoder may use previously decoded frames for reference, but due to compression, some content, such as text characters, may be distorted. In such instances, optical character recognition can be used to accurately predict text characters that have been distorted, and improve such characters for subsequent frames.

Accordingly, the process flow 200 may be used to provide optimized reduced bitrate encoding for titles scenes, credits scenes, and/or other text-based frames in video content. Due to the nature of text-based scenes, such optimization may result in minimal, if any, degradation to visual quality, while providing encoding efficiency gains, reduced encoding times, and reduced bandwidth utilization during streaming.

Figure 3:
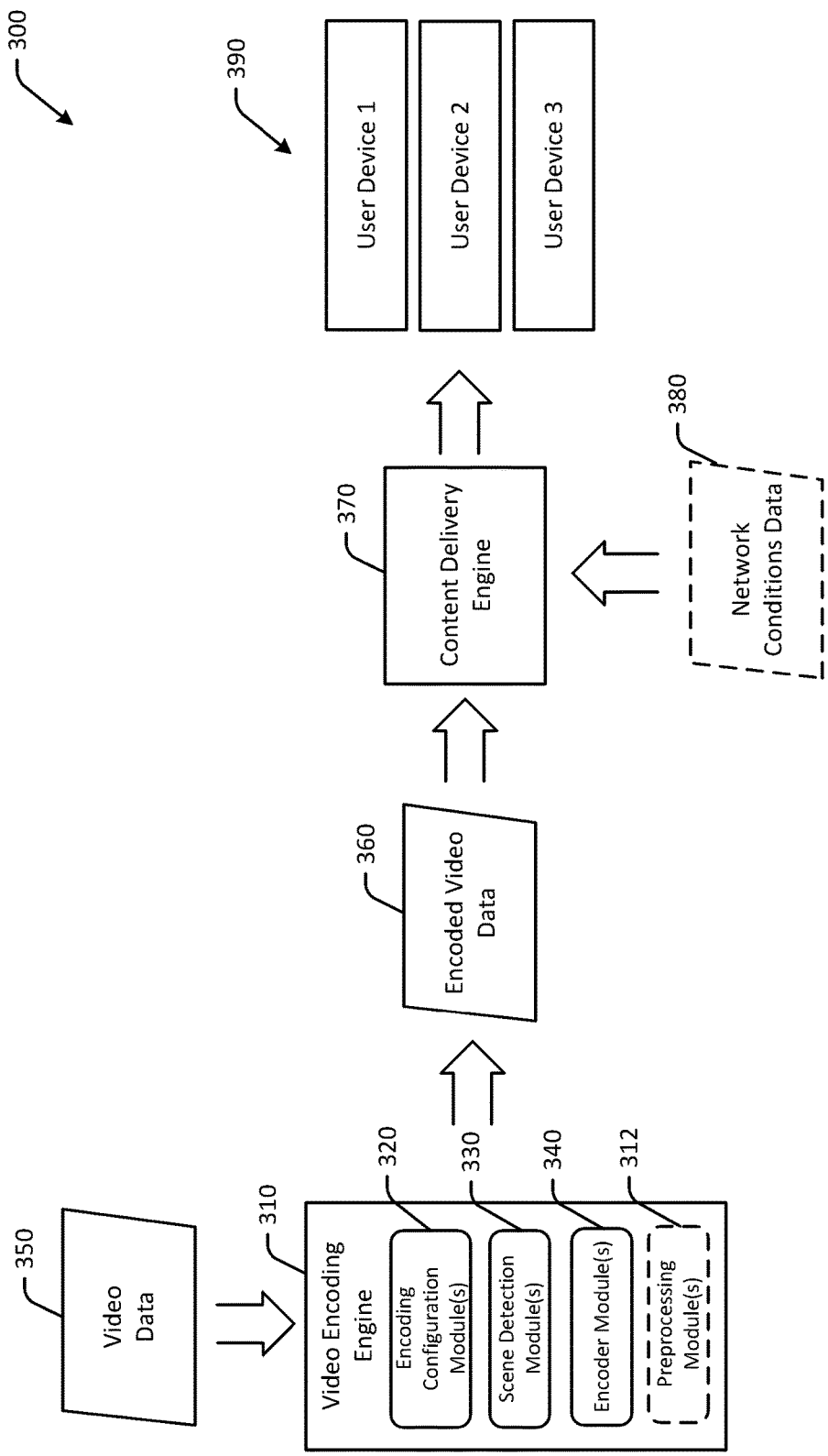
FIG. 3 is a schematic illustration of an example data flow for optimized reduced bitrate encoding for text-based content in video frames in accordance with one or more example embodiments of the disclosure.

FIG. 3 is a schematic illustration of an example data flow 300 for optimized reduced bitrate encoding for text-based content in video frames in accordance with one or more example embodiments of the disclosure. Different embodiments may include different, additional, or fewer inputs or outputs than those illustrated in the example of FIG. 3. The data flow 300 may be performed at one or more computer systems, or may be performed across a number of computer systems in a distributed computing environment.

In FIG. 3, a video encoding engine 310 and/or one or more video encoding module(s) may be configured to encode video content using different video encoding parameter settings. The video encoding engine 310 may be stored at and/or executed by one or more computer systems or remote servers. The video encoding engine 310 may include one or more modules or algorithms, and may be configured to output encoded video data 360, which may include one or more encoded data files at the same or different bitrates. The video encoding engine 310 and a content delivery engine 370 may be part of the same computer system or different computer systems.

The video encoding engine 310 may include one or more encoding configuration module(s) 320, one or more scene detection module(s) 330, one or more encoder module(s)

340, and/or one or more optional preprocessing module(s) 312. Additional or fewer, or different, modules may be included. The encoding configuration module(s) 320 may be configured to process and/or analyze video content, and to determine which encoder parameter settings are to be applied to the different video segments of content and/or different portions of individual frames of content. For example, the encoding configuration module(s) 320 may be configured to determine whether a frame or a particular video segment is a text-based video segment, such as a title scene or credits scene, and, if so, which encoding parameter settings are to be applied to the corresponding video data. In some instances, the encoding configuration module(s) 320 may select an encoding profile to use for encoding of a particular video segment. The encoding profile may include stored encoding parameter settings to use for encoding of the corresponding video segment.

The scene detection module(s) 330 may be configured to process video frames or segments to determine what type of content a frame or segment corresponds to, such as a story scene, a title scene, a credits scene, and so forth. In some instances, the scene detection module(s) 330 may be configured to determine whether the video segment is a text-based segment. A text-based segment may be defined as a scene that includes frames having a threshold amount of text, such as at least 20% text, and may include additional filters, such as light colored text against a dark colored background, dark colored text against a light colored background, or other filters. The scene detection module(s) 330 may be configured to generate timestamps or frame identifiers that represent start and end points for video segments. The start and end points may be used during the encoding process to determine the segments to which different encoding parameter settings are to be applied. In some embodiments, the encoding configuration module(s) 320 may receive data from the scene detection module(s) 330, and may use the data to determine corresponding encoding parameter settings for the respective video segments.

The encoder module(s) 340 may be configured to encode video data at different bitrates. The video data by the encoder module(s) 340 may be output by the video encoding engine 310 as the encoded video data 360.

For example, the video encoding engine 310 may receive one or more inputs for which encoded video data 360 is to be generated, such as video content or raw video data 350. The video data 350 may be video files corresponding to the video content to be encoded. The video encoding engine 310 may process the video data 350. For example, the video data 350 may be processed using one or more of the encoding configuration module(s) 320, the scene detection module(s) 330, and/or the encoder module(s) 340.

The optional preprocessing module(s) 312 may be configured to perform functions such as noise reduction, sharpening filtering, or other preprocessing functions prior to encoding. In some embodiments, scene detection, or detection of text-based content in frames may be performed at the encoder module(s) 340 as part of a lookahead process, instead of implementing the scene detection module(s) 330. Other embodiments may have different encoding implementations.

The video encoding engine 310 can include various types of logic used to implement the encoder module(s) 340 to encode a video frame using characteristics of visual elements. Visual elements metadata may be data related to the content of individual frames or video segments, such as the presence of imagery, text, colors, and so forth. The visual elements metadata may be automatically generated by the video encoding engine 310 or may be generated by another computer system and provided to the video encoding engine 310. In certain implementations, the encoder module(s) 340 uses visual elements metadata to encode the video frame in a one pass encoding process, with or without lookahead. In certain scenarios, one-pass encoding emphasizes speed, which, for example, may be beneficial for real-time encoding during live event streaming. In various implementations, the encoder module(s) 340 uses visual elements metadata in a multi-pass encoding process. For example, encoding parameters for the visual elements, video frames, and/or groups of pictures may be determined in the first pass and/or subsequent passes. The scene detection module(s) 330 may optionally generate visual elements metadata used during encoding. For example, the encoder module(s) 340 can use multi-pass encoding, and in a first stage of the encoding process, the encoder module(s) 340 or the scene detection module(s) 330 can analyze a received video frame to determine various characteristics of the visual elements in the video frame. For example, the encoder module(s) 340 or the scene detection module(s) 330 can flag a region of text and perform optical character recognition on the letters in the region. A second stage of the multi-pass encoding then encodes the video frame using the characteristics determined during the first-pass, such as, for example, the size and location of the region of text, the repetition of particular alphanumeric characters in the region, and so forth. In some scenarios, a higher quality or better compressed encode of the media content can be generated since the encoding is based on detailed analysis by the encoder module(s) 340 or the scene detection module(s) 330 of the various characteristics of the media content itself. In various implementations, the video encoding engine 310 can transmit video frames to another computer system for analysis. For example, a different computer system can execute text detection software to perform the region of text detection and/or optical character recognition process as described above, and can provide to the video encoding engine 310 the size, location, repetition and other visual element characteristics as described above for configuring encoding parameters of the encoder module(s) 340.

In some implementations, visual elements metadata includes a descriptor that can specify how the value of a feature, such as a circle shape or alphanumeric character, is represented. In some implementations, the descriptors are based on a grid layout or a histogram profile, each of which can be used separately or in combination. For example, the grid layout permits defining characteristics of different portions of a visual element, such as individual letters in a caption. The histogram profile can describe measurable characteristics over the whole subset of pixels corresponding to the visual element, such as a complexity estimate. In certain implementations, a description scheme can collate multiple descriptors into sets that represent a higher-level semantic representation of a visual element, such as a collection of alphanumeric characters corresponding to scrolling end credits.

Visual elements metadata can include characteristics that correspond to a wide variety of categories. As non-limiting examples, categories may include those defined by the MPEG-7 Visual standard, such as color, texture, shape, and motion. In certain implementations, visual elements metadata can include color characteristics, such as but not limited to a dominant color(s) parameter to indicate where a small number of colors, which can be derived by color value quantization, can accurately characterize a visual element. As another example, a color histogram, with or without color quantization, can be used to characterize a visual element. In some implementations, visual elements metadata can include texture characteristics, including but not limited to parameters for texture type (e.g., synthetic, natural, etc.), edges, and for homogeneous textures. For example, parameters can specify the edges corresponding to a border for a picture-in-picture preview of an upcoming media presentation. As another example, homogeneous textures can be described by filtering coefficients that characterize the regularity and coarseness of textures, such as an asphalt roadway. In various implementations, visual elements metadata can include shape characteristics including but not limited to position and/or size for boundary box or contour-based representations of the shape of visual elements in a video frame. In certain implementations, shape characteristics can account for shape changes because of scaling, or shape changes due to occlusion occurring between multiple visual elements. In a class of implementations, visual elements metadata can include motion characteristics. For example, motion characteristics can describe camera motion, camera zoom, scene transitions, motion trajectory (e.g., vertical scrolling end credits, horizontal scrolling stock tickers), parametric motion of objects (e.g., arc path of a baseball), and so forth, which may be used to determine which encoding parameter settings can be applied to the segment or portions of frames in the segment.

In some instances, the visual elements metadata can be used to configure intra-frame prediction related encoding parameters that take advantage of spatial redundancy. For example, the location of the visual element, the components of the visual element, or each instance of the visual element are known and may be provided to the video encoding engine 310. These characteristics can be used to configure prediction encoding parameter(s) such as a pixel location, a range of pixels to search, a search resolution (e.g., n-pixels, sub-pel half pixel, sub-pel quarter pixel, etc.). In such scenarios, the search shape and range can be constrained, and/or the search resolution can be configured to achieve a balance between prediction accuracy (i.e., using a finer pixel resolution) and encoding latency.

Using one or more algorithms or modules, the video encoding engine 310 may generate the encoded video data 360 based at least in part on the video data 350. The encoded video data 360 may represent the different encoded video segments that may be at different bitrates.

The encoded video data 360 may be input at a content delivery engine 370. The content delivery engine 370 may be configured to send or otherwise cause delivery of encoded video streams to one or more user devices 390. The content delivery engine 370 may be configured to coordinate the delivery of video streams to one or more of the user devices 390 based at least in part on requests for content streams from the respective devices. In some embodiments, the content delivery engine 370 may be configured to analyze and/or assess local network conditions. The content delivery engine 370 may therefore receive optional network conditions data 380, which may be indicative of a network connection of each of the respective user devices 390. The content delivery engine 370 may be configured to determine available bandwidth at a given point in time, as well as bandwidth consumed by individual content streams and/or bandwidth allocated to individual content streams. The content delivery engine 370 may determine encoded video data of a certain bitrate based at least in part on the network conditions and/or available bandwidth for sending data to a particular device.

The video encoding engine 310 may therefore be configured to encode video content, and the content delivery engine 370 may provide the content to the user devices 390. The user devices 390 can decode the encoded media content for playback. By encoding the different segments of video using different encoding parameters, and by using relatively lower bitrates for text-based content, such as credits scenes, overall efficiency of the system may be improved, bandwidth consumption may be reduced, and encoding times may be reduced.

Figure 4:
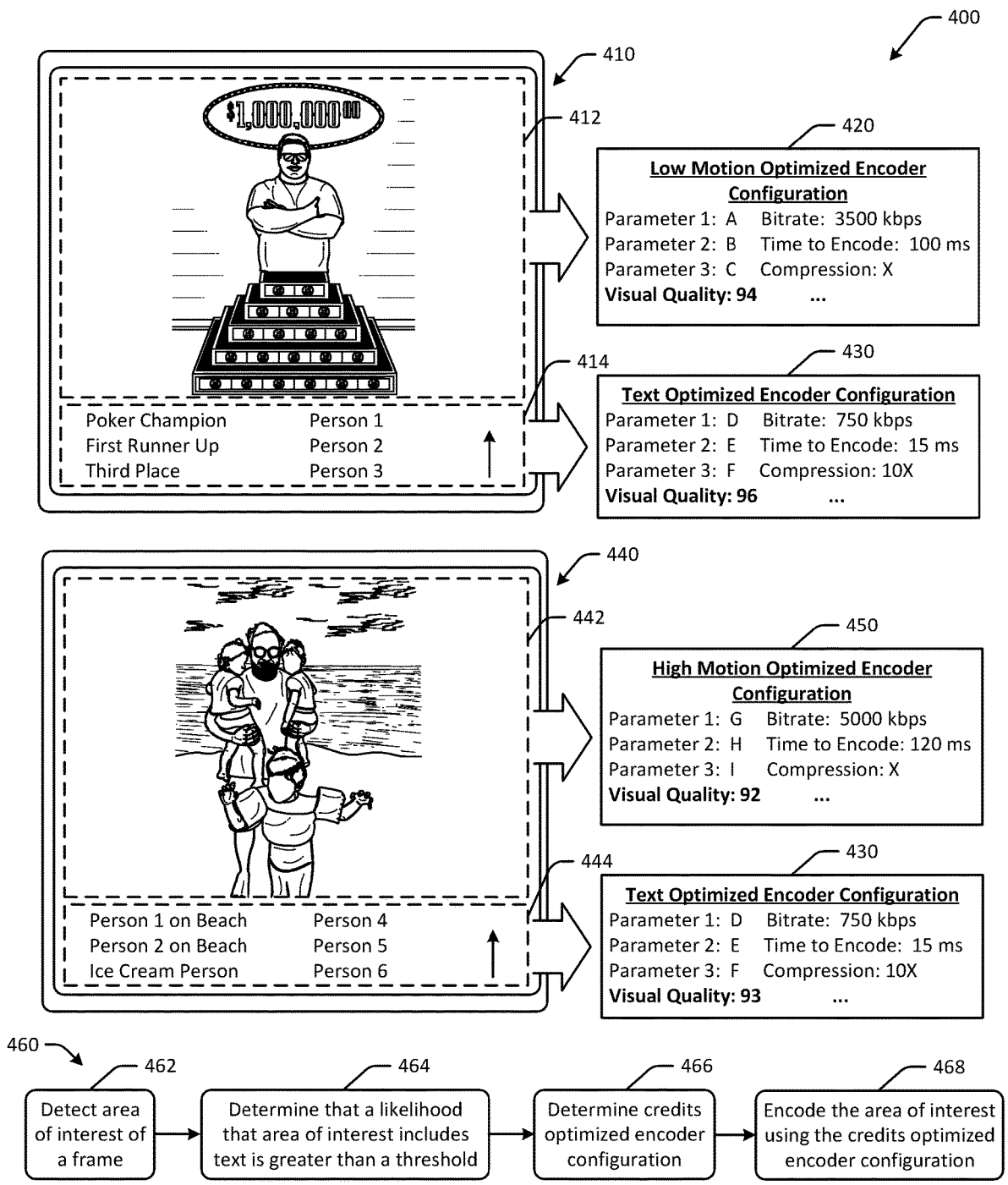
FIG. 4 is a schematic illustration of example encoding of hybrid frames in accordance with one or more example embodiments of the disclosure.

FIG. 4 is a schematic illustration 400 of example encoding of hybrid frames in accordance with one or more example embodiments of the disclosure. While example embodiments of the disclosure may be described in the context of movies and video, it should be appreciated that the disclosure is more broadly applicable to any type of streamable video content. Some or all of the blocks of the process flows in this disclosure may be performed in a distributed manner across any number of devices. The operations of process flow 460 may be optional and may be performed in a different order.

In FIG. 4, a first hybrid frame 410 is depicted. The video encoding engine may determine that the first hybrid frame 410 includes a first region 412 and a second region 414. A video encoding engine executed by a server may determine that the first hybrid frame 410 is a hybrid frame via analysis of the individual frame and/or processing of the video segment of which the first hybrid frame 410 is a part. The video encoding engine may be configured to determine that the first region 412 is a low motion region, where there is limited motion between the first hybrid frame 410 and adjacent frames. The video encoding engine may therefore select a low motion optimized encoder configuration 420 to encode the first region 412 of the frame. The low motion optimized encoder configuration 420 may include various parameter settings, such as a first quantization parameter setting, a first transform skip setting, and so forth. The low motion optimized encoder configuration 420 may have an associated bitrate of 3500 kbps and a compression ratio of X. The low motion optimized encoder configuration 420 may be used to encode the first region 412 in 100 milliseconds (this time is provided for example only and to illustrate decreases in encoding times). The visual quality to a viewer of the first region 412 may be 94, or another subjective indicator of high visual quality.

Although discussed in the example of FIG. 4 as discrete contiguous regions of a frame, in other embodiments, the first region 412 and the second 414 may have different formats. For example, the first region 412 may be text on a billboard that appears in a scene presented in the larger frame, where the remainder of the frame (excluding the billboard) is defined as the second region 414.

In some embodiments, motion prediction may be used to classify frames or portions of frames as high or low motion, and/or to detect whether text is credits-related text. Motion prediction involves deriving a motion vector representing a displacement between a subset of pixels in a reference video frame and a subset of pixels in a different video frame, and the subset of pixels are determined to exceed a threshold for a block matching algorithm. For example, visual elements metadata can include a direction and scrolling rate, and the server can configure a motion search range encoding parameter based on the direction, scrolling rate, and the elapsed time for a subsequent video frame that contains the visual element that corresponds to the visual element in a different position in a subsequent video frame. In addition to reducing computation time by constraining or eliminating motion searching, using visual elements metadata to configure encoding parameters to result in more accurate motion vectors can reduce the size of residuals, and therefore reduce the overall transmission bit rate.

The video encoding engine may determine that the second region 414 of the video encoding engine is a text-based region, or a text based portion of the frame. Instead of text, other embodiments may determine that the second region 414 includes non-continuous tone imagery, discrete tone imagery, sharp edged features or graphics, dual toned or binary content, or other content that may be analogous to text-based content with respect to the optimized encoding techniques described herein. In the example of FIG. 4, the video encoding engine may determine that the second region 414 includes a credits scene or credits of the video content. The video encoding engine may therefore select a text optimized encoder configuration 430 to encode the second region 414 of the frame. The text optimized encoder configuration 430 may include various parameter settings, such as a second quantization parameter setting, a second transform skip setting, and so forth. The text optimized encoder configuration 430 may have an associated bitrate of 750 kbps and a compression ratio of 10×, or ten times the compression ratio of the first region 412 encoded with the low motion optimized encoder configuration 420. The text optimized encoder configuration 430 may be used to encode the second region 414 in 15 milliseconds, as opposed to the 100 milliseconds for the first region 412 (this time is provided for example only and to illustrate decreases in encoding times). The visual quality to a viewer of the second region 414 may be 96, or another indicator of high visual quality, regardless of the decreased bitrate and/or increased compression.

In some embodiments, client device functionality, such as upscaling capabilities at a client device or user device used to stream and/or present video content, may be used to determine whether content can be encoded at a reduced resolution and/or reduced frame rate (which may then be upscaled at the client device). For example, a server may receive a request for video content from a user device, and may determine upscaling functionality at the user device. Depending on whether such functionality is available, the server may determine a reduced resolution and/or a reduced frame rate at which to encode the frames of the video content, and may cause the encoded video content to be sent to the user device.

Embodiments of the disclosure may therefore encode different portions of hybrid frames using different encoding parameters that result in optimized encoding and reduced bitrates for text-based regions of content. For example, embodiments may determine whether content in a frame is high motion content or low motion content, and may encode the content accordingly.

For example, a second hybrid frame 440 is depicted. The video encoding engine may determine that the second hybrid frame 440 includes a first region 442 and a second region 444. A video encoding engine executed by a server may determine that the second hybrid frame 440 is a hybrid frame via analysis of the individual frame and/or processing of the video segment of which the second hybrid frame 440 is a part. The video encoding engine may be configured to determine that the first region 442 is a high motion region, where there is high motion between the second hybrid frame 440 and adjacent frames. The video encoding engine may therefore select a high motion optimized encoder configuration 450 to encode the first region 442 of the frame. The high motion optimized encoder configuration 450 may include various parameter settings, such as a third quantization parameter setting, a third transform skip setting, and so forth. The high motion optimized encoder configuration 450 may have an associated bitrate of 5000 kbps and a compression ratio of X. The high motion optimized encoder configuration 450 may be used to encode the first region 442 in 120 milliseconds (this time is provided for example only and to illustrate decreases in encoding times). The visual quality to a viewer of the first region 442 may be 92, or another indicator of high visual quality.

The video encoding engine may determine that the second region 444 of the video encoding engine is a text-based region, or a text based portion of the frame. The video encoding engine may determine that the second region 444 includes a credits scene or credits of the video content. The video encoding engine may therefore select the text optimized encoder configuration 430 to encode the second region 444 of the frame. The text optimized encoder configuration 430 may include various parameter settings, such as the second quantization parameter setting, the second transform skip setting, and so forth. The text optimized encoder configuration 430 may have an associated bitrate of 750 kbps and a compression ratio of 10×, or ten times the compression ratio of the first region 442 encoded with the high motion optimized encoder configuration 450. The text optimized encoder configuration 430 may be used to encode the second region 444 in 15 milliseconds, as opposed to the 120 milliseconds for the first region 442 (this time is provided for example only and to illustrate decreases in encoding times). The visual quality to a viewer of the second region 444 may be 93, or another indicator of high visual quality, regardless of the decreased bitrate and/or increased compression.

Accordingly, the server may be configured to determine that a segment of video content includes a hybrid frame, such as the first hybrid frame 410 or the second hybrid frame 440. The hybrid frame(s) may include a content scene portion (e.g., the first regions 412, 442, etc.) and a text portion (e.g., the second regions 414, 444, etc.). The server may determine a first subset of pixels of the hybrid frame corresponding to the content scene portion or region, and may determine a second subset of pixels of the hybrid frame corresponding to the text portion or region. The server may encode the hybrid frame using the first encoder configuration for the first subset of pixels, and the second encoder configuration for the second subset of pixels. In some instances, the text region or text portion may be detected by using optical character recognition processing of the hybrid frame. In some embodiments, a boundary of the text portion may be determined by using fast fourier transform processing of the hybrid frame. In some embodiments, encoding parameters may be applied on a block-by-block basis (e.g., 8×8 pixels, 16×16 pixels, etc.) instead of an entire frame basis during the encoding process. For instance, quantization parameter settings may be applied on a block-by-block basis to portions of the frames. Similarly, deblocking and/or deringing settings may be applied on a block-by-block basis.

For example, the process flow 460 may be executed by one or more servers. At a first block, an area of interest of a frame may be detected. To detect the area of interest, the frame may be processed using optical character recognition processing, fast fourier transform processing, or other forms of image processing. At a second block 464, the server may determine that a likelihood that the area of interest includes text is greater than a threshold. For example, if the optical character recognition returns results with the word "credits" or actor names, the server may determine that the likelihood the area of interest includes text is greater than a threshold likelihood, such as 70%. Some embodiments may include more than one threshold, or may otherwise account for likelihoods that do not satisfy a threshold, but still fall within a certain range. For example, if the threshold in the example of FIG. 4 is 70%, the area of interest may be determined to include text if the likelihood is determined to be greater than or equal to 70%. However, if the likelihood is less than 70%, such as between 60%-70% (or another range), a set of blended encoding parameters may be used to encode the region or area of interest, and if the likelihood is below 60%, the default or otherwise applicable encoding parameters may be used for encoding. In one embodiment, regions of frames falling within a range, but not satisfying a threshold, may be unknown portions or unknown regions. Accordingly, the server may determine that a likelihood that the unknown portion includes text is less than a first threshold and greater than a second threshold (e.g., where the range is defined by the first and second thresholds, etc.), and may determine a blended encoder configuration comprises encoding parameter settings between the first encoder configuration and the second encoder configuration. The blended settings may be determined as averages of the individual parameter settings, where appropriate. The server may determine a third subset of pixels of the hybrid frame corresponding to the unknown portion, and may encode the hybrid frame using the blended encoder configuration for the third subset of pixels.

At a third block 466, a credits optimized encoder configuration may be determined. For example, the server may determine the text optimized encoder configuration 430 discussed with respect to the examples of FIG. 4. At a fourth block 468, the server may encode the area of interest using the credits optimized encoder configuration, such as the text optimized encoder configuration 430. In certain scenarios, the encoder calculates the number of bits for encoding a subset of pixels using a transform, calculates the number of bits for encoding the subset of pixels without a transform, and selects the option with the fewest bits. In some cases, using visual elements metadata to configure transform or skip encoding parameters such that the server does not need to test and compare both options reduces encoding latency.

It should be appreciated that the encoding techniques described herein are not limited to the specific encoding parameters discussed. The encoding techniques described herein are compatible with a wide range of encoding parameters, such as but not limited to encoding parameters associated with a particular hardware/software encoder, video compression standard, encoder API, commercial or consumer video production application, profile, extension (e.g., HEVC Screen Content Coding (SCC), etc.), and so forth. It should further be appreciated that encoding parameters are not limited to the spatial (e.g., intra-block copying, etc.) or temporal (e.g., inter-frame motion prediction) contexts as described in certain examples herein. For example, encoding parameters include but are not limited to chromatic and achromatic parameters such as luminance, chroma, color space, and so forth.

Figure 5:
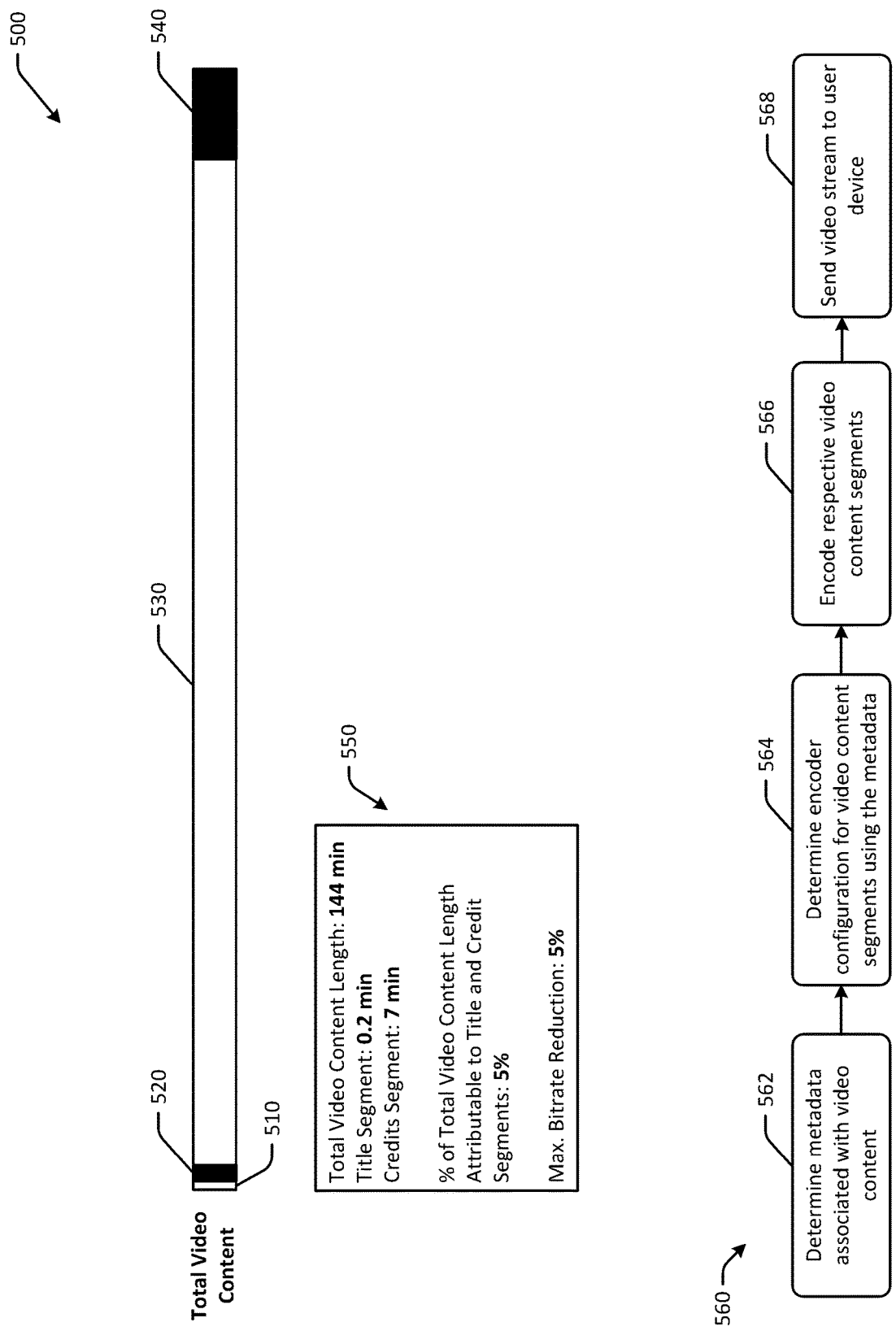
FIG. 5 is a schematic illustration of an example use case of optimized reduced bitrate encoding for text-based content in video frames and example process flow in accordance with one or more example embodiments of the disclosure.

FIG. 5 is a schematic illustration of an example use case 500 of optimized reduced bitrate encoding for text-based content in video frames and example process flow in accordance with one or more example embodiments of the disclosure. In FIG. 5, a video content file is illustrated as blocks of content that represent different segments. The content may be a movie, television show, or other video content. Other embodiments may have a different process flow than that illustrated in FIG. 5. The operations of the process flow in FIG. 5 may be performed in any suitable order across any number of devices, and may include operations that are performed at least partially concurrently.

A first portion 510 of the video content may be introductory content, such as production company logos and other content. A second portion 520 of the content may be a titles scene the presents a title of the video content. The size of the blocks representing video segments in FIG. 5 may not be to scale and are for illustrative purposes only. The second portion 520 may be followed by a third portion 530, which may be the content scenes of the video content. A fourth portion 540 may be end scenes of the video content, such as credits scenes that present actors in the video content. Some video content may include content scenes that are interspersed with the end scenes of the fourth portion 540.

Data 550 may represent various information regarding the video content. For example, the video content may have a total video content length of 144 minutes, of which the video segment corresponding to the titles is 0.2 minutes, and the video segment corresponding to the credits is 7 minutes. Accordingly, 7.2 minutes of the 144 minutes, in one example, may represent text-based scenes or frames of the video content. The text-based scenes, such as titles and credits scenes, may therefore be 5% of the total video content length. Therefore, by applying the optimized bitrate reduction encoding to the 7.2 minutes of content, a maximum bitrate reduction of 5% is achieved, without degrading a user experience, as visual quality may not be impacted by the reduced bitrate applied to the text-based portions of video content, or the text-based portions of frames of video.

In some embodiments, one or more computer systems, such as streaming servers or a video encoding engine, may be configured to execute a process flow 560 to stream content to a user device with optimized reduced bitrate encoding. At a first block 562, the computer system may determine metadata associated with video content. The metadata may indicate which video segments or individual frames are imagery or story content frames, and which video segments or frames are text-based frames. The metadata may be associated with the video content or may be generated by the computer system, such as via processing of the individual frames in the video content.

At a second block 564, the computer system may determine an encoder configuration for the video content segments using the metadata. For example, the computer system may determine which encoding parameters to use for different segments of the video content based at least in part on the type of content present in the respective video segments. For content with story scenes, a first encoding profile with respective encoding parameter settings may be used, whereas for text-based scenes, such as credits scenes, a second encoding profile with different respective encoding parameter settings may be used.

At a third block 566, the respective video content segments may be encoded, such as by the computer system. The video content segments may be encoded at different bitrates, and may be encoded using the respective encoding parameters for the content of the individual segments. As a result, segments with text-based content may be encoded at lower bitrates than other segments, and may be encoded using a different encoding profile. Bandwidth consumption may therefore be reduced and encoding efficiency may be increased.

At a fourth block 568, the computer system may send the video stream to a user device. For example, the content may be streamed to the user device after being encoded using the appropriate encoding parameters. Due to the reduced bitrate for text-based content, bandwidth consumption attributable to the streamed content may be reduced and encoding efficiency may be increased.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
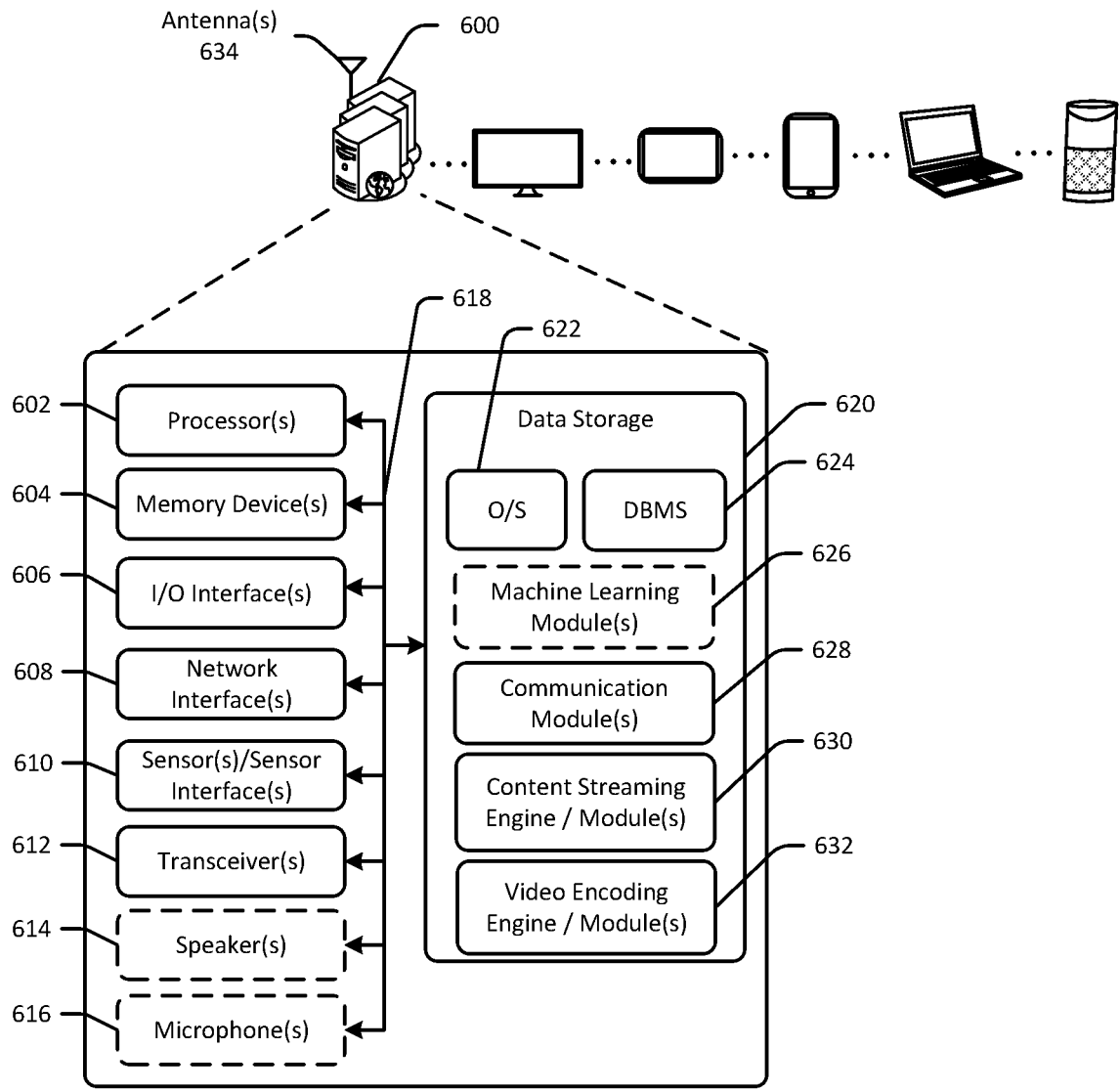
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, search engines, user devices, or the like. In some embodiments, a single remote server or single group of remote servers may be configured to perform more than one type of title and credit scene determinations and/or encoding functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(s) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional machine learning module(s) 626, one or more communication module(s) 628, one or more content streaming engine/module(s) 630, and/or one or more video encoding engine/module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, active streaming data, available bandwidth data, historical network performance information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional machine learning module(s) 626 may include computer-executable instructions, code, or the like that responsive to execution by one or more of the processor(s) 602 may perform functions including, but not limited to, determining start and/or end timestamps corresponding to text-based content, such as credits scenes in video content, determining portions of a frame to which different encoding parameter profiles are to be applied, generating one or more machine learning models or algorithms, determining or classifying pixels, determining frames of content, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content streaming engine/module(s) 630 may include computer-executable instructions, code, or the like that responsive to execution by one or more of the processor(s) 602 may perform functions including, but not limited to, analyzing digital content, detecting servers and/or communicating with egress systems, determining streaming content quality values, determining streaming content, determining or analyzing audio files, identifying certain portions of content, extracting segments of content, generating video files, and the like.

The video encoding engine/module(s) 632 may include computer-executable instructions, code, or the like that responsive to execution by one or more of the processor(s) 602 may perform functions including, but not limited to, determining video files, determining encoding parameters, determining content display size, determining content screen resolution, determining files to encode, encoding video files, sending encoded data, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module (s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, video content for streaming to a user device;
   determining a first segment of the video content comprises a content scene;
   determining a second segment of the video content that comprises a credits scene;
   determining that an average luminance value of one or more frames of the second segment is less than or equal to a threshold luminance value;
   determining, based at least in part on the average luminance value, that the credits scene comprises light colored text presented against a dark colored background;
   determining a first encoder configuration to encode the first segment of video content, wherein the first encoder configuration comprises a first quantization parameter setting;
   encoding the first segment using the first encoder configuration;
   determining a second encoder configuration to encode the second segment of the video content, wherein the second encoder configuration comprises a second quantization parameter setting that is greater than the first quantization parameter setting;
   encoding the second segment using the second encoder configuration;
   sending the first segment to a user device for presentation; and
   sending the second segment to the user device for presentation;
   wherein the first segment is encoded at a first bitrate that is greater than a second bitrate at which the second segment is encoded.

2. The method of claim 1, wherein encoding the second segment using the second encoder configuration comprises:
   filtering pixel brightness variations equal to or less than a brightness difference threshold;
   filtering chroma value variations equal to or less than a chroma difference threshold;
   applying hierarchical motion estimation;
   excluding chroma search or chroma coding;
   reducing motion search range and motion search direction;
   refining reference frame quality of text; or
   refining intracoded quality of text.

3. The method of claim 1, wherein determining that the second segment of the video content comprises the credits scene comprises one or more of:

determining that a difference between chroma values associated with one or more frames of the second segment are less than or equal to a clustering threshold value; or determining that fast fourier transform frequencies of one or more frames of the second segment are associated with text.

4. The method of claim 1, further comprising:

determining that a third segment of the video content comprises a hybrid frame including a content scene portion and a text portion;

detecting the text portion using optical character recognition processing of the hybrid frame;

determining a first subset of pixels of the hybrid frame corresponding to the content scene portion;

determining a second subset of pixels of the hybrid frame corresponding to the text portion; and encoding the hybrid frame using the first encoder configuration for the first subset of pixels, and the second encoder configuration for the second subset of pixels.

5. A method comprising:

determining, by one or more computer processors coupled to memory, that a first set of frames of video content comprises a content scene;

determining that a second set of frames of the video content comprises text;

determining that a distribution of luminance values of one or more frames of the second set of frames satisfies a threshold luminance distribution;

determining, based at least in part on the distribution of luminance values, that the text of the second set of frames is light colored text presented against a dark colored background;

determining a first encoder configuration to encode the first set of frames, wherein the first encoder configuration comprises a first encoding parameter setting;

determining a second encoder configuration to encode the second set of frames, wherein the second encoder configuration comprises a second encoding parameter setting that is different than the first encoding parameter setting;

encoding the first set of frames using the first encoder configuration; and encoding the second set of frames using the second encoder configuration;

wherein the first set of frames is encoded at a first bitrate that is greater than a second bitrate at which the second set of frames is encoded.

6. The method of claim 5, wherein the first encoding parameter setting and the second encoding parameter setting are one of: a quantization parameter setting, a deringing parameter setting, a deblocking parameter setting, a transform skip parameter setting, a lossless coding parameter setting, a prefiltering strength parameter setting, a denoising parameter setting, a noise reducing parameter setting, or a sharpening parameter setting.

7. The method of claim 6, wherein at least one of the first encoding parameter setting or the second encoding parameter setting is applied on a block-by-block basis.

8. The method of claim 5, wherein encoding the second set of frames using the second encoder configuration comprises:

filtering pixel brightness variations equal to or less than a brightness difference threshold;

filtering chroma value variations equal to or less than a chroma difference threshold;

applying hierarchical motion estimation;

excluding chroma search or chroma coding;

reducing motion search range and motion search direction;

refining reference frame quality of text; or refining intracoded quality of text.

9. The method of claim 5, further comprising:

determining that a third set of frames of the video content comprises a hybrid frame including a content scene portion and a text portion;

determining a first subset of pixels of the hybrid frame corresponding to the content scene portion;

determining a second subset of pixels of the hybrid frame corresponding to the text portion; and encoding the hybrid frame using the first encoder configuration for the first subset of pixels, and the second encoder configuration for the second subset of pixels.

10. The method of claim 9, wherein the hybrid frame further comprises an unknown portion, the method further comprising:

determining that a likelihood that the unknown portion includes text is less than a first threshold and greater than a second threshold;

determining a blended encoder configuration comprises encoding parameter settings between the first encoder configuration and the second encoder configuration;

determining a third subset of pixels of the hybrid frame corresponding to the unknown portion; and encoding the hybrid frame using the blended encoder configuration for the third subset of pixels.

11. The method of claim 9, further comprising:

detecting the text portion using optical character recognition processing of the hybrid frame.

12. The method of claim 9, further comprising:

detecting a boundary of the text portion using fast fourier transform processing of the hybrid frame.

13. The method of claim 5, wherein determining that the second set of frames of the video content comprises text comprises one or more of:

determining that a difference between chroma values associated with one or more frames of the second set of frames are less than or equal to a clustering threshold value; or determining that fast fourier transform frequencies of one or more frames of the second segment are associated with text.

14. The method of claim 5, further comprising:

receiving a request for the video content from a user device;

determining upscaling functionality at the user device;

determining a reduced resolution or a reduced frame rate at which to encode the first set of frames and the second set of frames; and causing the encoded video content to be sent to the user device.

15. A device comprising:

memory configured to store computer-executable instructions; and at least one computer processor configured to access the memory and execute the computer-executable instructions to:

determine that a first set of frames of video content comprises a content scene;

determine that a second set of frames of the video content comprises text;

determine that a distribution of luminance values of one or more frames of the second set of frames satisfies a threshold luminance distribution;

determine, based at least in part on the distribution of luminance values, that the text of the second set of frames is light colored text presented against a dark colored background;

determine a first encoder configuration to encode the first set of frames of video content, wherein the first encoder configuration comprises a first encoding parameter setting;

determine a second encoder configuration to encode the second set of frames of the video content, wherein the second encoder configuration comprises a second encoding parameter setting that is different than the first encoding parameter setting;

encode the first set of frames using the first encoder configuration; and encode the second set of frames using the second encoder configuration;

wherein the first set of frames is encoded at a first bitrate that is greater than a second bitrate at which the second set of frames is encoded.

16. The device of claim 15, wherein the first encoding parameter setting and the second encoding parameter setting are one of: a quantization parameter setting, a deringing parameter setting, a deblocking parameter setting, a transform skip parameter setting, a lossless coding parameter setting, a prefiltering strength parameter setting, a denoising parameter setting, a noise reducing parameter setting, or a sharpening parameter setting.

17. The device of claim 15, wherein the at least one processor is configured to encode the second set of frames using the second encoder configuration by executing the computer-executable instructions to:

filter pixel brightness variations equal to or less than a brightness difference threshold;

filter chroma value variations equal to or less than a chroma difference threshold;

apply hierarchical motion estimation;

exclude chroma search or chroma coding;

reduce motion search range and motion search direction;

refine reference frame quality of text; or refine intracoded quality of text.

18. The device of claim 15, wherein the at least one processor is further configured to access the memory and execute the computer-executable instructions to:

determine that a third set of frames of the video content comprises a hybrid frame including a content scene portion and a text portion;

determine a first subset of pixels of the hybrid frame corresponding to the content scene portion;

determine a second subset of pixels of the hybrid frame corresponding to the text portion;

encode the hybrid frame using the first encoder configuration for the first subset of pixels, and the second encoder configuration for the second subset of pixels.

* * * * *